2,814,958

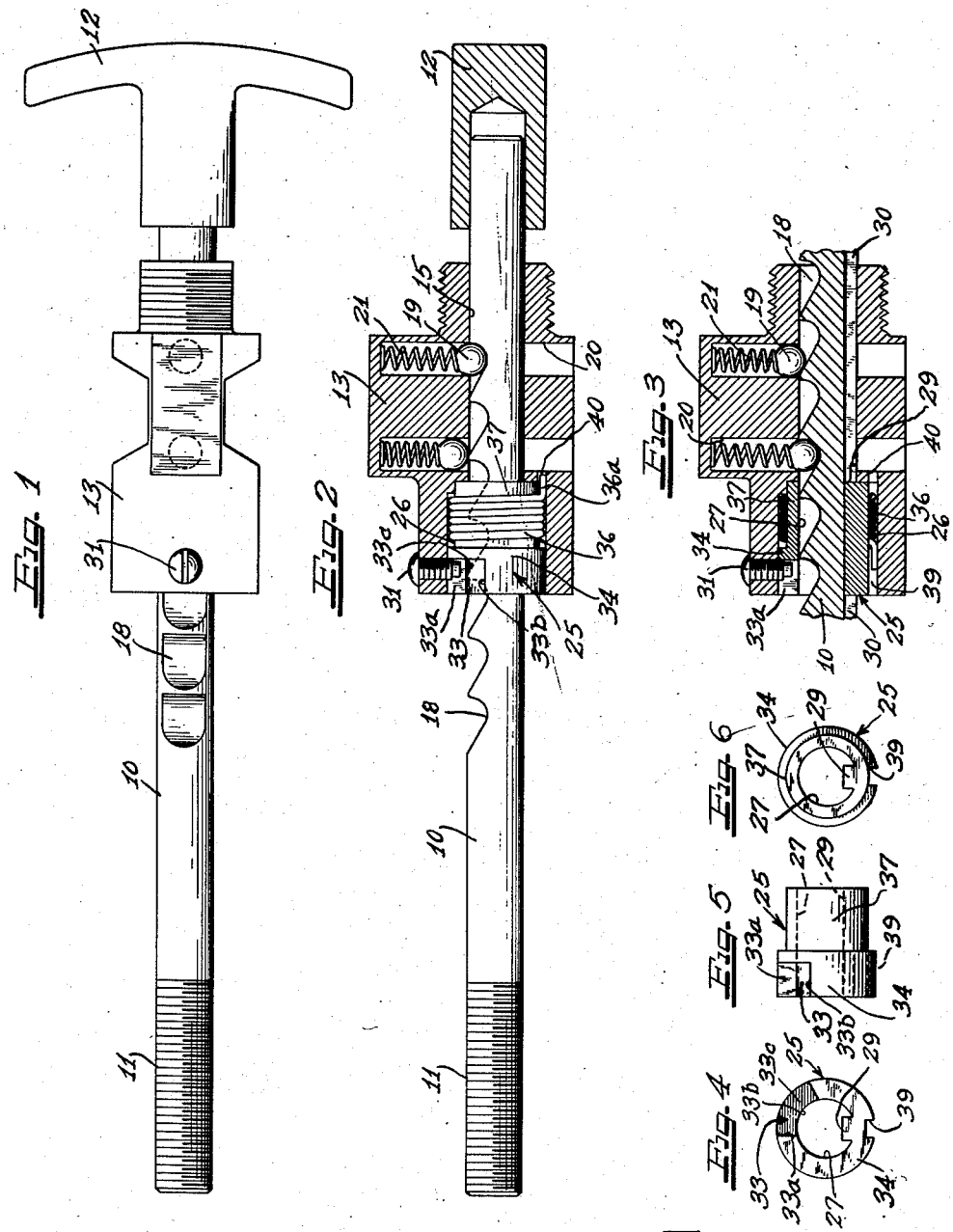
Dec. 3, 1957    B. J. POWELL ET AL    2,814,958
ACTUATORS FOR AUTOMOBILE HEATER CONTROLS AND THE LIKE
Filed July 16, 1954
Inventors
BURNET J. POWELL
NORMAN B. COX

# United States Patent Office 2,814,958
Patented Dec. 3, 1957

ACTUATORS FOR AUTOMOBILE HEATER CONTROLS AND THE LIKE

Burnet J. Powell, Berkley, and Norman B. Cox, Dearborn, Mich., assignors to Houdaille Industries, Inc., a corporation of Michigan Application July 16, 1954, Serial No. 443,812

7 Claims. (Cl. 74—503)

This invention relates to an actuating mechanism for use in automotive vehicles and the like, and more particularly to an actuating mechanism which is moved axially to incremental longitudinal positions and which is released by rotation, such a control being especially adapted for use with automotive equipment such as heaters, hand brakes and the like.

It is an important object of the present invention to provide an improved actuating mechanism of the above type.

It is a further object of the present invention to provide a novel actuating member return system for biasing an actuating rod of the above type toward a given angular orientation.

Another object of the present invention is to provide an actuating mechanism which is readily manufactured and assembled by mass production methods and which is rugged and reliable in use.

Other objects, features and advantages of the present invention will be more fully apparent from the following detailed description taken in conjunction with the accompanying drawings, in which:

Figure 1 is a top plan view of a control mechanism constructed in accordance with the present invention;

Figure 2 is a longitudinal sectional view showing certain parts in side elevation and taken centrally through the structure of Figure 1;

Figure 3 is a fragmentary longitudinal sectional view similar to Figure 2, but showing the control member in a slightly different longitudinal position and showing additional parts in section;

Figure 4 is a left end elevational view of a torsion member constructed in accordance with the present invention;

Figure 5 is a side elevational view of the member of Figure 4; and

Figure 6 is a right end elevational view of the structure of Figure 4.

As shown on the drawings:

The present invention relates to controls which are longitudinally movable to operate various equipment, such as heaters and parking brakes in vehicles. The illustrated embodiment involves a control wherein the control member is retracted by pulling force and is retained in incremental retracted positions to maintain equipment in a desired adjusted position. However, the invention is equally applicable to push type controls wherein the control member is moved forwardly, for example against the resistance of the equipment to be controlled, and retained in incremental forward actuated positions.

As indicated in Figures 1 and 2, the control member may comprise a cylindrical rod 10 having a threaded forward end 11 for connection with suitable equipment to be controlled and having at its rear end a handle 12 fixed thereto for manipulation of the rod. The rod is reciprocably and rotatably mounted in a housing 13 which may be secured to a vehicle or the like in any suitable manner, the housing having a cylindrical bore 15 therethrough slidably receiving the actuating rod 10.

For retaining the actuating rod in incremental longitudinal retracted positions to maintain equipment controlled thereby in selected adjusted positions, the actuating rod may be provided with a plurality of serially spaced notches 18 therealong as indicated in Figs. 1 and 2. Cooperating with these notches are spring urged detent balls 19 disposed in transverse bores 20 in the housing 13, the balls being urged against the control rod by means of springs 21 bottomed in the bores 20. As will be seen from Figures 2 and 3, the spacing of the bores 20 is arranged so that when one detent ball such as the right one in Figure 2 is seated in a notch, the other ball will be between notches. Thus, the balls alternately engage notches to give a finer adjustment of the rod 10. It will be observed that as the control rod 10 is moved rearwardly in the orientation shown, the detent balls 19 will be operative to retain the rod in its attained position. To release the detent balls, it is merely necessary to rotate the handle 12, clockwise in the present case, to disengage the balls 19 from the notches 18 and allow the rod 10 to be moved to its forward inactive position.

For returning the rod to its ratcheting angular orientation illustrated in Figs. 1 and 2, and to limit rotary movement of the rod 10 relative to the housing 13 in the desired manner, a torsion member 25 is provided which is seated in a cylindrical recess 26 at the forward end of the housing 13. The torsion member 25 has a central cylindrical aperture 27 for receiving the rod 10 in sliding relation, and the member 25, as seen in Figs. 3 and 4, is provided with a longitudinal keyway 29 which fits into a corresponding slot 30 in the actuating rod. The rod 10 is thus free to reciprocate in the aperture 27, but the rod and torsion member are interconnected for joint rotation.

For limiting the range of rotation of the rod 10, the range of rotation of the torsion member 25 is limited by means of a screw or abutment 31 projecting through the housing 13 and into the forward recess 26 to cooperate with an arcuate slot 33 at the forward end of the enlarged cylindrical shoulder portion 34 of the torsion member 25. In normal ratcheting orientation of the rod 10, the screw 31 at its inner end abuts against the top 33a at one longitudinal side of the slot 33. When the handle 12 is twisted clockwise, the opposite longitudinal face 33b of slot 33 engages the screw 31 to limit rotation of the rod, the rod however attaining an angular position to clear the detent mechanism 19 to accommodate release of the rod. It will be further observed that the screw 31 abuts against the inner end face 33c of the slot to retain the torsion member 25 in assembly in the recess 26 of the housing.

For biasing the actuating rod 10 towards its ratcheting angular orientation shown, a torsion spring 36 surrounds the body portion 37 of the torsion member and has one end seated in an aperture 39, Figs. 3 and 4, in the torsion member and its opposite end seated in a recess 40 in the housing, Figs. 2 and 3. The torsion spring 36 thus urges the actuating rod in a counter-clockwise direction relative to the housing and urges the stop face 33a against the screw 31 as indicated in Fig. 2.

The operation of the control member will now be readily apparent. If it is desired to adjust equipment connected with the actuating rod 10, the handle 12 is grasped by the operator and pulled straight rearwardly in the angular orientation shown in Figs. 1 and 2, the detent balls 19 acting alternately on the notches 18 in the actuating rod to retain the rod in the attained position. If now it is desired to release the control, the handle 12 is turned clockwise through approximately a quarter turn until the screw 31 engages the shoulder 33b, at which time the detent balls 19 will be out of engagement with the notches 18 and the actuating rod 10 may be moved forwardly to its normal position or to some other desired position. If the control rod handle is released out of its normal angular orientation shown in Figs. 1 and 2, the torsion spring 36 will be operative to turn the rod into its ratcheting angular orientation. The torsion spring 36 is also, of course, effective to resist inadvertent disengagement of the detent balls 19 from the notches 18 by undesired rotation of the actuating rod 10.

In assembly of the apparatus, it will be understood that the detent balls 19 and springs 21 are retained in the upper portions of the passages 20 in any suitable manner while the actuating rod 10 is inserted into the bore 15 of the housing 13. Thereafter the torsion member 25 with the torsion spring 36 thereon may be inserted over the forward end of the rod 10 and moved into the recess 26 of the housing with the torsion spring rear end 36a seated in the aperture 40 in the housing. The screw 31 is then inserted into the housing to project into the slot 33 in the illustrated manner.

Thus the assembly of the torsion mechanism with the housing is extremely simple and rapid, and the torsion assembly comprises a minimum number of easily manufactured parts.

It will be understood that many modifications and variations may be effected without departing from the scope of the novel concepts of the present invention.

We claim as our invention:

1. A control mechanism comprising a rotatably mounted control member, a fixed housing consisting essentially of a compact sleeve surrounding a portion of said control member, and a torsion member carried by said housing and constrained by said housing for limited rotational movement relative thereto, said torsion member being interengaged with said control member to prevent relative rotation therebetween, and torsion spring means extending between said housing and said torsion member to urge said torsion member and said control member to rotate in one direction relative to said housing, said control member having means on the end thereof forwardly of said housing for attachment to a control to be actuated by movement of said control member.

2. A control mechanism comprising a reciprocally and rotatably mounted control member, a housing consisting essentially of a compact sleeve surrounding a portion of said control member, cooperating means carried by said housing and said control member for retaining said control member in selected longitudinal positions relative to said housing, said cooperating means being releasable by rotation of said control member relative to said housing, a torsion member carried by said housing and constrained by said housing for limited rotational movement relative thereto, said torsion member being interengaged with said control member to prevent relative rotation therebetween while accommodating relative axial movement thereof, and torsion spring means in said housing and extending between said torsion member and said housing to urge said control member to rotate toward an angular orientation in which said cooperating means are engageable to retain the control member, said control member having a threaded end forwardly of said housing for attachment to a control to be actuated by movement of said control member.

3. A control mechanism comprising a housing consisting essentially of a compact sleeve having an aperture therethrough, a control member reciprocally and rotatably mounted in said aperture, cooperating means carried by said housing and said control member for retaining said control member in selected longitudinal position relative to said housing in one angular orientation of the control member, said cooperating means being releasable by rotation of said control member relative to said housing to a second angular orientation of said control member, said housing having a recess, a torsion member in said recess and having an aperture for receiving said control member therethrough in reciprocal relation, first means on said control member and said torsion member resisting relative rotation therebetween, second means on said housing and said torsion member limiting relative rotation therebetween to limit rotation of said control member, and torsion spring means in said housing recess and connected between said torsion member and said housing for urging said control member to rotate toward said one angular orientation, and said second means limiting rotation of said control member and said torsion member against the action of said torsion spring means, said control member having means on the end thereof forwardly of said housing for attachment to a control to be actuated by movement of said control member.

4. A control mechanism comprising a housing consisting essentially of a compact sleeve having a cylindrical bore therethrough with an annular recess at one end thereof, a control member reciprocally and rotatably mounted in said bore, means carried by said housing for retaining said control member in selected longitudinal positions, a torsion member in said recess having a cylindrical aperture receiving said control member therethrough in reciprocal relation, means on said control member and said torsion member resisting relative rotation therebetween, a torsion spring in said housing recess and encircling said control member and connected between said torsion member and said housing for urging said torsion member and said control member to rotate in a given direction relative to said housing, said control member having means on the end thereof forwardly of said housing for attachment to a control to be actuated by movement of said control member.

5. A control mechanism comprising a fixed housing consisting essentially of a compact sleeve having an aperture therethrough, a control member rotatably mounted in said aperture, said housing having an annular recess surrounding said control member, a torsion member rotatably mounted in said recess and having an arcuate slot at the outer periphery thereof, means extending between said control member and said torsion member resisting relative rotation therebetween, and an abutment carried by said housing and projecting into said slot to limit relative rotation between said control member and said housing, said control member having means on the end thereof forwardly of said housing for attachment to a control to be actuated by movement of said control member.

6. A control mechanism comprising a fixed housing having a longitudinal aperture, a control member rotatably mounted in said aperture, said housing having a recess arcuately disposed about said control member, a torsion member having an enlarged arcuate shoulder fitting slidably in said recess and having a body portion extending in spaced relation to the wall of said recess, and torsion spring means in said recess and encircling said body portion and connected between said housing and said arcuate shoulder to urge said torsion member in one angular direction relative to said housing, and means interconnecting said torsion member and said control member for rotation of said control member with said torsion member under the urging of said torsion spring means, said control member having means on the forward end thereof forwardly of said housing for attachment to a control to be actuated by movement of said control member.

7. A control mechanism comprising an integral tubular housing having a cylindrical longitudinal bore therethrough, a transverse bore intersecting said longitudinal bore, a control rod reciprocally and rotatably mounted in said longitudinal bore and having notches serially therealong, a detent ball carried in said transverse bore for cooperating with said notches in one angular orientation of said control rod, spring means seated at the blind end of said transverse bore and acting on said detent ball to urge the same into engagement with said rod, said housing having an annular recess at one end thereof surrounding said longitudinal bore, a torsion member having a cylindrical bore receiving said control member seated in said recess and having an enlarged diameter shoulder slidably disposed in said recess for guiding arcuate movement of said torsion member on its axis, a screw extending through the wall of said housing defining said recess and projecting into said recess, said torsion member having an arcuate slot in the enlarged diameter shoulder portion thereof providing arcuately spaced shoulders and receiving the end of said screw to limit the arcuate movement of said torsion member, means interconnecting said torsion member and said control rod to resist rotation therebetween, and a torsion spring in said recess and encircling the body portion of said torsion member and having one end seated in an aperture in said enlarged shoulder and having the opposite end seated in said housing to urge said torsion member and said control rod into an angular orientation where the detent ball cooperates with the notches in said control rod, said control rod having a threaded end forwardly of said tubular housing for attachment to a control to be actuated by movement of said control member.

References Cited in the file of this patent

UNITED STATES PATENTS

| | | |
|---|---|---|
| 2,329,722 | Jandus | Sept. 21, 1943 |
| 2,415,303 | Moore | Feb. 4, 1947 |
| 2,561,961 | White | July 24, 1951 |
| 2,631,470 | Sandberg | Mar. 17, 1953 |
| 2,666,339 | Schwarz | Jan. 19, 1954 |
| 2,735,311 | Hinsey | Feb. 21, 1956 |